(12) United States Patent
Mohrlock

(10) Patent No.: US 9,944,142 B2
(45) Date of Patent: Apr. 17, 2018

(54) WHEEL SUSPENSION FOR A VEHICLE AXLE

(71) Applicant: AUDI AG, Ingolstadt (DE)

(72) Inventor: Dominik Mohrlock, Buxheim (DE)

(73) Assignee: AUDI AG, Ingolstadt (DE)

( * ) Notice: Subject to any disclaimer, the term of this patent is extended or adjusted under 35 U.S.C. 154(b) by 5 days.

(21) Appl. No.: 15/211,106

(22) Filed: Jul. 15, 2016

(65) Prior Publication Data
US 2017/0015264 A1 Jan. 19, 2017

(30) Foreign Application Priority Data
Jul. 18, 2015 (DE) .................. 10 2015 009 309

(51) Int. Cl.
*B60G 7/02* (2006.01)
*B60G 3/20* (2006.01)

(52) U.S. Cl.
CPC .............. *B60G 7/02* (2013.01); *B60G 3/20* (2013.01); *B60G 2200/156* (2013.01); *B60G 2206/016* (2013.01)

(58) Field of Classification Search
CPC ...... B60G 7/02; B60G 3/20; B60G 2206/016; B60G 2200/156
See application file for complete search history.

(56) References Cited

U.S. PATENT DOCUMENTS

| 4,334,693 | A | | 6/1982 | Huber | |
|---|---|---|---|---|---|
| 4,709,935 | A | * | 12/1987 | Takizawa | ............... B60G 3/202 180/414 |
| 2002/0180171 | A1 | * | 12/2002 | Hasebe | .................... B60G 7/02 280/124.128 |

(Continued)

FOREIGN PATENT DOCUMENTS

| DE | 2845345 C2 | 10/1980 |
|---|---|---|
| DE | 102013016767 | 8/2014 |

(Continued)

OTHER PUBLICATIONS

Domlnik Mohrlock et al., U.S. Pat. No. 8,925,945, 2014-0239608, Aug. 28, 2014.
(Continued)

*Primary Examiner* — Darlene P Condra
(74) *Attorney, Agent, or Firm* — Henry M. Feiereisen LLC

(57) ABSTRACT

A wheel suspension for a vehicle axle includes a wheel carrier carrying a wheel which is displaceable rearward in a longitudinal direction of the vehicle in case of a frontal collision; a steering link, articulately connecting the wheel carrier to a vehicle superstructure, the steering link including at least two control arms articulately connected to the wheel carrier via respective support sites on the wheel carrier and to the vehicle superstructure via respective support sites on the vehicle superstructure; and an actuating element coupled with a first one of the two control arms and impinging the first control arm with a torsional force in response to a collision force resulting from the rearward displacement of the wheel caused by the frontal collision so as to cause detachment of the first control arm from the support site on the superstructure and/or on the wheel carrier.

12 Claims, 4 Drawing Sheets

(56) References Cited

U.S. PATENT DOCUMENTS

| | | | | |
|---|---|---|---|---|
| 2005/0275181 A1* | 12/2005 | MacIsaac | ................. | B60G 3/01 |
| | | | | 280/124.103 |
| 2009/0066049 A1* | 3/2009 | Kunert | ................... | B60G 3/265 |
| | | | | 280/124.134 |
| 2013/0241166 A1* | 9/2013 | Paintmayer | .............. | B60G 7/02 |
| | | | | 280/124.125 |
| 2015/0102592 A1* | 4/2015 | Kerstan | ................... | B60B 35/00 |
| | | | | 280/784 |
| 2016/0236529 A1* | 8/2016 | Sakaguchi | ............. | B60G 7/001 |
| 2017/0182875 A1* | 6/2017 | Scharf | ................ | B60K 5/1241 |

FOREIGN PATENT DOCUMENTS

| | | |
|---|---|---|
| DE | 102013207144 A1 | 10/2014 |
| JP | 2012-236481 | 12/2012 |
| WO | WO2015/044753 A1 | 4/2015 |

OTHER PUBLICATIONS

Dominik Mohrlock et al., U.S. Pat. No. 9,108,482, 2014-0232083-A1, Aug. 21, 2014.
Dominik Mohrlock et al., U.S. Pat. No. 9,205,874, US2014-0319787A1, Oct. 30, 2014.
Dominik Mohrlock et al., U.S. Pat. No. 8,967,670, 2014-0217782, Aug. 7, 2014.
Dominik Mohrlock et al., U.S. Pat. No. 9,096,273, 2015-0076866-A1, Mar. 19, 2015.

\* cited by examiner

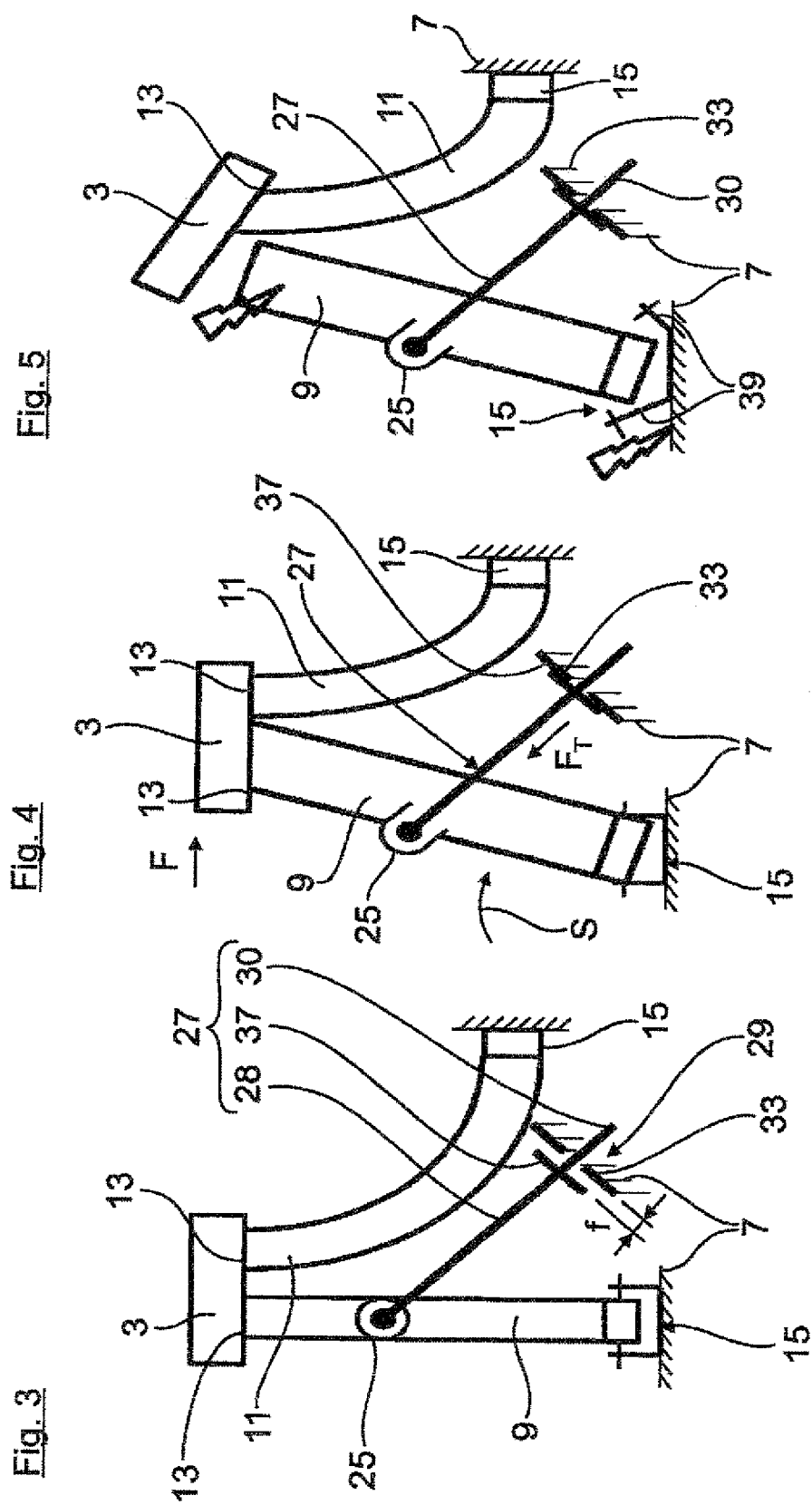

WHEEL SUSPENSION FOR A VEHICLE AXLE

CROSS-REFERENCES TO RELATED APPLICATIONS

This application claims the priority of German Patent Application, Serial No. 10 2015 009 309.6, filed Jul. 18, 2015, pursuant to 35 U.S.C. 119(a)-(d), the content of which is incorporated herein by reference in its entirety as if fully set forth herein.

BACKGROUND OF THE INVENTION

The present invention relates to a wheel suspension for a vehicle axle.

The following discussion of related art is provided to assist the reader in understanding the advantages of the invention, and is not to be construed as an admission that this related art is prior art to this invention.

In a small-overlap crash test the collision with the obstacle occurs with a small lateral overlap. The impact forces, viewed in transverse direction of the vehicle, are therefore introduced at least partially outside the front-side cross member of the vehicle directly into the crash-facing front wheel. The wheel rim of the front wheel is thus displaced in longitudinal direction of the vehicle rearwards in the direction of the foot well of the passenger compartment thereby posing the risk of intrusion of the wheel rim into the foot well of the passenger compartment.

From DE 10 2013 016 767 A1 a generic wheel suspension for a vehicle front axle is known. The wheel suspension is formed by a wheel carrier, which carries a front wheel, and a steering link that articulately connects the wheel carrier with the vehicle superstructure. In a lower steering plane of the steering link a front two-point cross member and a rear control arm are arranged. The front transverse control arm is configured so that in case of a collision it tears off at its support site on the superstructure and is thus decoupled from the vehicle superstructure. In the further course of the crash the wheel carrier is therefore pivoted with the front wheel about a support site of the rear longitudinal control arm on the superstructure, namely in conjunction with a transverse displacement of the front wheel in longitudinal direction of the vehicle toward the outside of the vehicle. This prevents intrusion of the front wheel rim into the foot well of the passenger compartment.

The above-mentioned decoupling of the two-point transverse control arm can for example be accomplished by pyrotechnical means. However, such a detonation of components of the vehicle or screws is technically complicated, requires input of external energy and may under no circumstances be triggered by error. In addition the known decoupling mechanisms oftentimes have the disadvantage that the control arm is only released relatively late during the crash.

It would therefore be desirable and advantageous to provide a wheel suspension for a vehicle axle, which compared to the state of the art provides an improved crash performance in a simple manner.

SUMMARY OF THE INVENTION

According to one aspect of the present invention, a wheel suspension for a vehicle axle, in particular a front axle of a two-track vehicle, includes a wheel carrier carrying a wheel which is displaceable rearward in a longitudinal direction of the vehicle in case of a frontal collision; a steering link, articulately connecting the wheel carrier to a vehicle superstructure, the steering link including at least two control arms articulately connected to the wheel carrier via respective support sites on the wheel carrier and to the vehicle superstructure via respective support sites on the vehicle superstructure; and an actuating element coupled with a first one of the two control arms and impinging the first control arm with a torsional force in response to a collision force resulting from the rearward displacement of the wheel caused by the frontal collision, wherein the torsional force causes detachment of the first control arm from the support site on the superstructure and/or on the wheel carrier, thereby enabling the wheel carrier together with the second control arm to pivot about the support site of the second control arm on the superstructure in a further course of the collision.

The invention is based on the fact that the conventional support sites of a control arm (i.e., consoles and/or for example ball bearings) are predominantly configured to withstand tensile a compressive stress, whereas torsion stress usually does not occur during normal driving operation and is therefore not taken into account for the purpose of such a design. In light of the above the wheel suspension has according to the characterizing portion of patent claim 1 an actuating element which in the case of a collision impinges the first control arm with a torsion force by means of which the first control arm is torn out of the support site on the vehicle superstructure and/or the wheel carrier. The control arm is therefore for example torn or sheared out of the bearing bracket or, in case of a ball bearing, is dislodged using a relatively small force.

The above-mentioned actuating element is preferably only active in the event of a crash, i.e., it is switched inactive during normal operation. The actuating element can preferably be connected with the control arm for force transmission, i.e., for example as an actuating contour made of the same material as and/or formed integral as one piece with the control arm or as a separate element. In the case of a collision (crash) the actuating element can build up a torsion force during contacting a counter contour on the superstructure. In this case the actuating element and the counter contour on the superstructure result in a blocking effect, which counteracts a crash related pivot movement of the first control arm. On the other hand during normal driving operation the actuating element is spaced apart by a clearance from the counter contour on the superstructure. The counter contour on the superstructure can be directly formed in an auxiliary frame of the superstructure or for example in the vehicle body longitudinal member.

In order to provide proper torsional movement of the first control arm in the event of a crash it is advantageous when the actuating element is connected to a connection site on the first control arm, which connection site is spaced apart by a predefined lever length from a control arm force axis (or effective direction of the control arm). The control arm force axis is defined by the support sites on the vehicle superstructure or the wheel carriers, through which the force axis extends straight.

According to another advantageous feature of the invention, the actuating element can be a strut, which is configured with a movement stop. The strut can be articulately connected to an attachment point on the first control arm for force transmission. The opposite end of the strut on the other hand may be supported for displacement in a longitudinal guide of the superstructure. The longitudinal guide can for example be a pocket like recess in the longitudinal member of the vehicle body or in the auxiliary frame. In case of a collision the movement stop on the strut can be brought into contact with the counter contour of the superstructure while building up a torsional force. On the other hand during normal operation the movement stop on the strut is not in contact with the counter contour of the superstructure.

According to another advantageous feature of the invention the longitudinal guide can be a pocket-like recess with a recess bottom which transitions into a sidewall that extends upwards from the bottom. The bottom of the recess can have a through-opening through which an end of the strut is guided with sufficient clearance. The movement stop of the strut can be guided within the pocket-like recess and in case of a crash abut the bottom of the recess, which represents the counter contour of the superstructure.

In an arrangement which saves mounting space, the strut can also be arranged on the side of the first control arm which faces away from the crash. The strut is thus subjected to compression in case of a collision resulting in build up of a torsional force on the first control arm. As an alternative the strut can also be arranged on the side of the first control arm that faces toward the crash. In this case the strut is not subjected to compression in case of a collision but with a tensile force, i.e., resulting in build up of a torsional force on the first control arm.

In a concrete configuration when a compression strut axle is involved the first control arm and the second control arm can be arranged in a lower control arm plane of the steering link. In this case the first control arm, which is compressed in case of a crash, can be a two-point transverse control arm, while the second control arm is configured as a longitudinal control arm.

As an alternative also a lower control arm plane is conceivable in which the front first control arm is configured as a longitudinal control arm and the rear second control arm as a two-point transverse control arm. This arrangement is referred to as a tension strut axle.

The steering link can in addition also have two further transverse control arms in an upper control arm plane of the steering link and a tie rod coupled with the steering transmission. The thusly installed two-point transverse control arm can be used as a supporting arm on which a suspension spring and a vibration damper can be supported.

BRIEF DESCRIPTION OF THE DRAWING

Other features and advantages of the present invention will be more readily apparent upon reading the following description of currently preferred exemplified embodiments of the invention with reference to the accompanying drawing, in which:

FIGS. 3 to 5 show respective views illustrating a crash course in a lower control arm plane of the wheel suspension shown in FIG. 1.

DETAILED DESCRIPTION OF PREFERRED EMBODIMENTS

Figure 1:
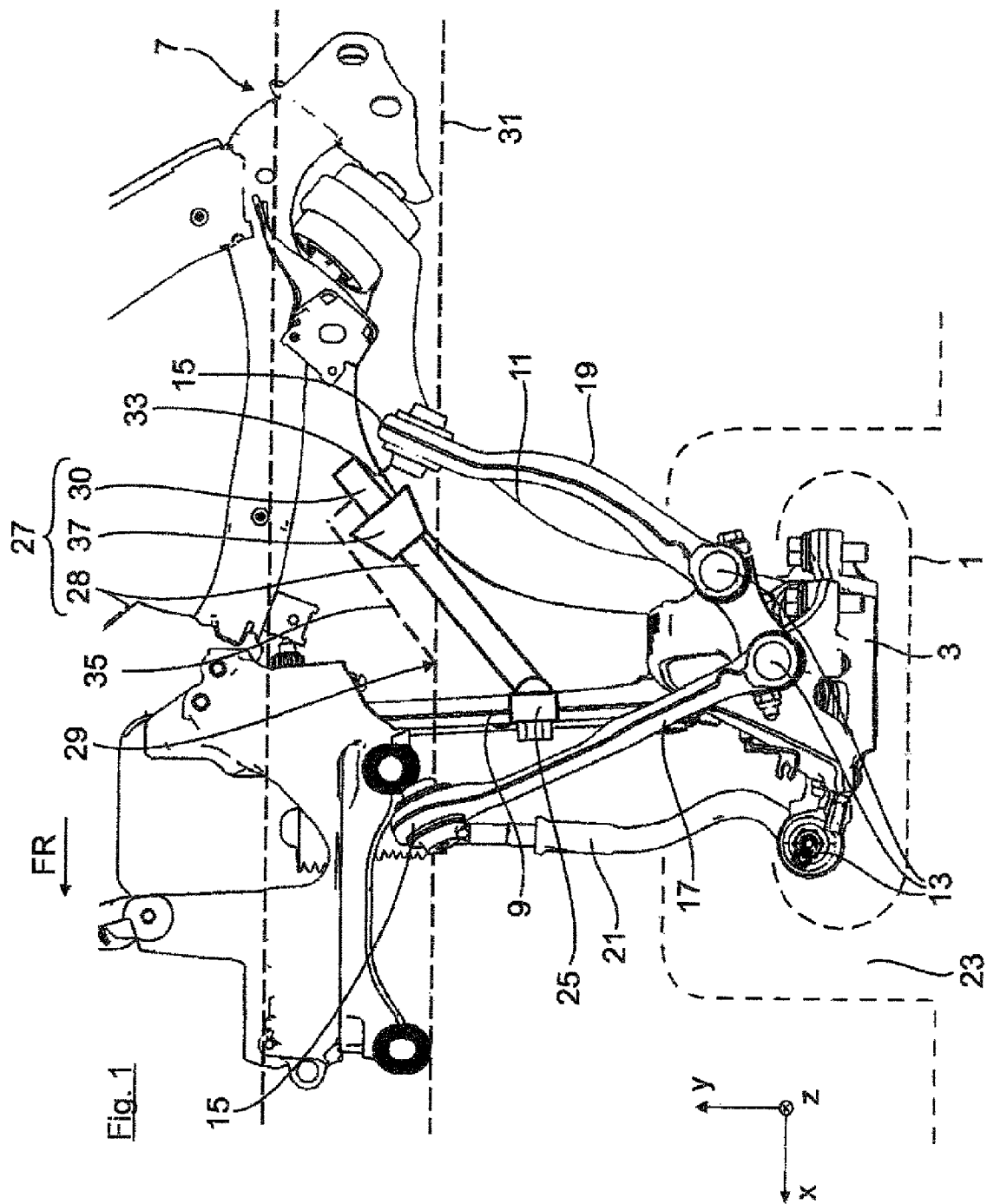
FIG. 1 shows a partial view from above of a wheel suspension in a fort axle of a vehicle with partially dashed lined indicated vehicle body.

Throughout all the Figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

FIG. 1 shows a top view of wheel suspension mounted in a vehicle front axle for steered front wheels 1 of a two track motor vehicle. The wheel suspension is mounted mirror symmetrically with regard to a vehicle longitudinal center axis also on the opposite side in the front axle.

As shown in FIG. 1 the wheel suspension has a wheel carrier 3, which carries a front wheel 1. The wheel carrier is connected via a steering link on an auxiliary frame assigned to the vehicle superstructure 7. In FIG. 1 the steering link has a total of five control arms. The control arms are articulately connected to the wheel carrier support sites on support sites on the wheel carrier 3 which support sites are generally designated by reference numeral 13, and on the auxiliary frame with support sites on the superstructure which support sites are generally designated 15 which auxiliary frame is a component of the vehicle superstructure 7. The steering link has in a lower control arm plane, when viewed in driving direction FR, a front two-point transverse control arm 9 and a rear longitudinal control arm 11. The steering link also has in its upper control arm plane the control arms 17, 19 and a tie rod 21 which is coupled with a steering transmission and which is connected with the wheel carrier 3 on a support site 13 of the wheel carrier.

According to FIG. 1 the front wheel 1 is shown with the wheel not turned in and is positioned in a schematically indicated wheel housing 23 of the vehicle on the vehicle body.

Figure 2:
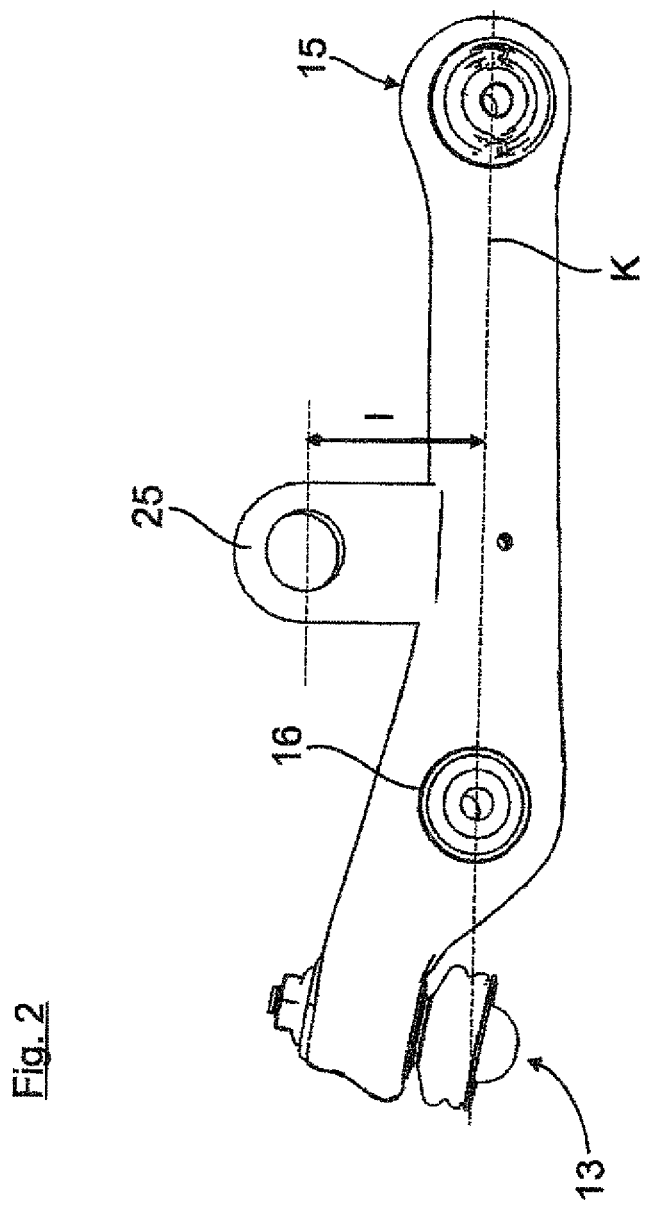
FIG. 2 shows a two-point control arm individually and in a side view.

As further shown in FIG. 1 a compression strut 27 is articulately connected on a connection site 25 in a center region of the two-point transverse control arm 9. The compression strut 27 acts as an actuating element in a front crash with low lateral overlap, by means of which a decoupling of the two-point transverse control arm 9 from the vehicle superstructure 7 and from the wheel carrier 3 is accomplished as will be described below with reference to FIGS. 3 to 6. In FIG. 1 or 2 the strut connection point 25 is spaced apart by approximately equal distances from the support site 13 on the wheel carrier and the support site 15 on the superstructure of the two-point transverse control arm 9.

The strut connection point 25 can for example be configured as a force transmitting metal ball joint. In addition the connection point 25 is spaced apart with a lever arm length I (FIG. 2) from a steering force axis K or effective steering direction of the two-point transverse control arm 9 in order to achieve an effective introduction of torsion force FT into the two-point transverse control arm 9. In the steering link the two-point transverse control arm 9 in the lower control arm plane serves as a support control arm on which a suspension spring and a vibration damper are supported on a support bearing 16 of the two-point transverse control arm 9.

According to FIG. 1 the compression strut 27 has a rod-like longitudinal basic body 28. The basic body is connected at an end side on the two-point transverse control arm 9 via the connection point 25. At its opposite end side the rod-like compression strut basic body 28 is extended by a guide section 30.

As further shown in FIG. 1 the compression strut 27 protrudes into a longitudinal guide 29 on the superstructure. The longitudinal guide 29 in FIG. 1 is realized as a pocket-like recess in a vehicle body longitudinal carrier 31 schematically indicated by dashed lines, i.e., with a bottom 33 and sidewalls 35 extending upwards from the bottom. The above-mentioned pressure strut guide section 30 extends through a through opening in the bottom 33 of the pocket-like recess with a clearance, wherein the bottom 33 of the recess interacts with the movement stop 37 of the compression strut 27 in the event of a crash as described below.

During normal driving operation the compression strut 27 is switched functionless. This means that according to FIG. 1 the movement stop 37 of the compression strut 27 is spaced apart with a clearance f (see FIG. 3) from the bottom 33 of the recess 29. The longitudinal guide 29 is therefore configured so that during normal driving operation the compression strut 27 does not exert a force on the two point transverse control arm 9.

The compression strut 27 is only activated in the event of a collision, as explained below by way of FIGS. 3 to 5, which show the two lower control arms 9, 11 of the lower control arm plane in a strongly simplified analogous model. Thus FIG. 3 shows the starting position, i.e., a normal driving operation in which the wheel carrier 3 is not turned in. The movement stop 37 of the compression strut 27 is spaced apart from a counter contour in the form of the bottom 33 of the longitudinal guide 29 on the superstructure by a clearance f. In case of a frontal crash with low lateral overlap impact forces F act on the wheel carrier 3. As a result the wheel carrier 3 is displaced rearwardly in a pivot movement S of the two-point transverse control arm 9. This occurs by using up the clearance f, i.e., until the movement stop 37 on the strut comes to abut the bottom 33 and as a result the compression strut 27 is pushed with a torsion force FT against the two-point transverse control arm 9 as shown in FIG. 4. The compression strut 27 and the bottom 33 on the superstructure cause a blocking which counteracts the crash-related pivot movement S of the two-point transverse control arm 9. This leads to a buildup of the torsion force FT with which the two-point transverse control arm is rotated about its longitudinal axis.

The support sites 13, 15 of the two-point transverse control arm 9 on the superstructure thus are impinged with a torsion, which occurs in the case of a crash but not during normal operation. Because the support sites 13, 15 are not configured to withstand such a torsion stress, a small force is already sufficient to destroy the support sites 13, 15 of the two-point transverse control arm 9.

Figure 6:
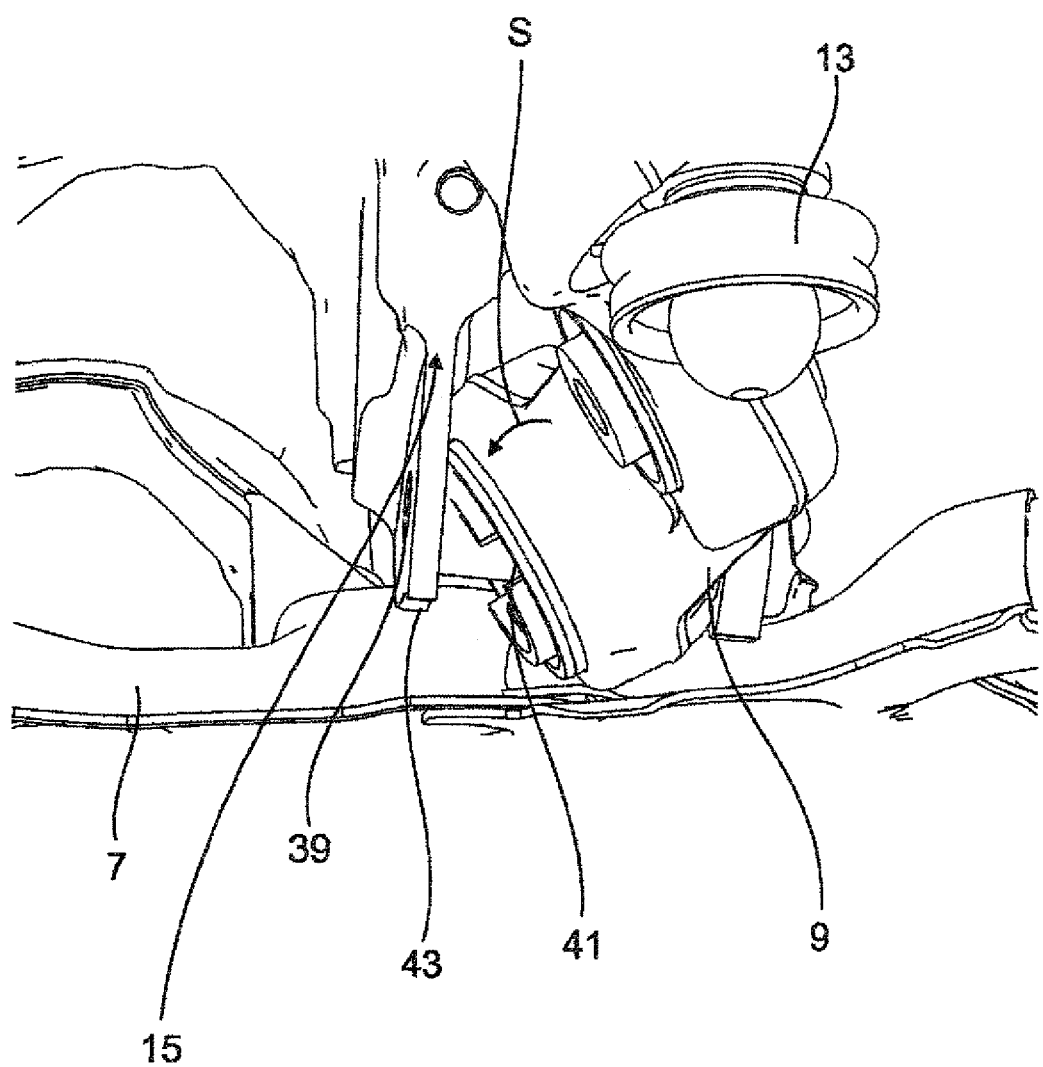
FIG. 6 shows a perspective view of a support site on the superstructure of the two point transverse control arm after crash related torsion stress.

FIG. 6 shows a perspective partial view of the support site 15 of the two-point transverse control arm 9 on the superstructure at the same point in time as shown in FIG. 4. For better illustration the wheel carrier 3 is not shown. The support site 15 of the two-point transverse control arm 9 on the superstructure is realized by a support console, which has console wings 39 between which the transverse control arm 9 is articulately connected. For this a not shown support bolt extends through the bearing eye 41 of he transverse control arm 9 and through the aligned bearing openings 43 of the console wings 39, which are oriented aligned with each other in the mounted state.

In FIG. 6 the bearing eye 41 of the two point transverse control arm 9 is no longer oriented aligned with the console side bearing openings 43, but rests on both sides against the console wings 39 so that a further rotation leads to destruction of the console wings 39.

What is claimed as new and desired to be protected by Letters Patent is set forth in the appended claims and includes equivalents of the elements recited therein:

1. A wheel suspension for a vehicle axle, in particular a front axle of a two-track vehicle, comprising:
    a wheel carrier carrying a wheel which is displaceable rearward in a longitudinal direction of the vehicle in case of a frontal collision;
    a steering link, articulately connecting the wheel carrier to a vehicle superstructure, said steering link comprising at least two control arms articulately connected to the wheel carrier via respective support sites on the wheel carrier and to the vehicle superstructure via respective support sites on the vehicle superstructure; and
    an actuating element coupled with a first one of the two control arms and impinging the first control arm with a torsional force in response to a collision force resulting from the rearward displacement of the wheel caused by the frontal collision, said torsional force causing detachment of the first control arm from the support site on the superstructure and/or on the wheel carrier thereby enabling the wheel carrier together with the second control arm to pivot about the support site of the second control arm on the superstructure in a further course of the collision.

2. The wheel carrier of claim 1, wherein a rearward displacement of the wheel carrier resulting from the frontal collision causes a pivot movement of the first control arm.

3. The wheel carrier of claim 1, further comprising a counter contour provided on the superstructure, wherein the actuating element is connected to the first control arm for force transmission, and/or in response to the collision contacts the counter contour while building up a torsional force.

4. The wheel carrier of claim 3, wherein contact between the actuating element and the counter contour caused by the collision counteracts a pivot movement of the first control arm.

5. The wheel suspension of claim 3, wherein during normal driving operation the actuating element is spaced apart from the counter contour by a clearance.

6. The wheel suspension of the claim 3, wherein the actuating element is connected to the first control am at a connection site on the first control arm, which is spaced apart from a force axis of the control arm by a lever arm length, said force axis extending as a straight line through the support sites of the first control arm on the superstructure and the wheel carrier.

7. The wheel carrier of claim 1, wherein the actuating element is constructed as a strut having a movement stop, said strut being articulately connected to the first control arm at a connection point on the first control arm for force transmission, and being supported for displacement in longitudinal direction of the strut in a guide provided on the superstructure, wherein in response to the collision the movement stop of the strut comes into contact with a counter contour provided on the superstructure thereby resulting in the torsional force, wherein during normal operation the movement stop is not in contact with the counter contour on the superstructure.

8. The wheel suspension of claim 7, wherein the strut is arranged on a crash-averted side of the first control arm and in response to the collision is impinged with a compression force resulting in the torsional force.

9. The wheel suspension of claim 7 wherein the strut is arranged on a crash facing side of the first control arm and that the strut in the case of collision is impinged with a tensile force resulting in the torsional force.

10. The wheel suspension of claim 1, wherein the first control arm and the second control arm are arranged in a lower plane of the steering link, and wherein the first control arm is configured as a two-point transverse control arm and/or the second control arm is configured as a longitudinal control arm.

11. The wheel suspension of claim 1, wherein the first control arm is a two-point control arm and the second control arm is a longitudinal control arm, said longitudinal control arm being located in the longitudinal direction of the vehicle in front of the two-point control arm, wherein the two-point control arm extends close to a center of the wheel and approximately points toward the center of the wheel, and wherein the strut is connected to the two-point control arm.

12. The wheel suspension of claim 1, wherein the steering link includes upper transverse control arms arranged in an upper plane of the steering link and constructed to separate of corresponding support sites in the event of a frontal collision.

* * * * *